(12) United States Patent
Han (10) Patent No.: US 12,001,212 B2
(45) Date of Patent: Jun. 4, 2024

(54) PATH PLANNING METHOD AND DEVICE FOR UNMANNED DEVICE

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventor: Song Han, Beijing (CN)

(73) Assignees: BEIJING JINGDONG SHANGKE INFORMATION TECHNOLOGY CO, LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 628 days.

(21) Appl. No.: 17/271,426

(22) PCT Filed: Aug. 6, 2019

(86) PCT No.: PCT/CN2019/099326
§ 371 (c)(1),
(2) Date: Feb. 25, 2021

(87) PCT Pub. No.: WO2020/057278
PCT Pub. Date: Mar. 26, 2020

(65) Prior Publication Data
US 2021/0311483 A1    Oct. 7, 2021

(30) Foreign Application Priority Data
Sep. 20, 2018    (CN) .......................... 201811096783.2

(51) Int. Cl.
*B60W 60/00*    (2020.01)
*G05D 1/00*    (2006.01)
(Continued)

(52) U.S. Cl.
CPC ....... *G05D 1/0214* (2013.01); *B60W 60/0011* (2020.02); *G05D 1/0272* (2013.01);
(Continued)

(58) Field of Classification Search
CPC .. G05D 1/0214; G05D 1/0272; G05D 1/0274; G05D 2201/0216; B60W 60/0011;
(Continued)

(56) References Cited

U.S. PATENT DOCUMENTS 8,827,619 B2 *  9/2014  Schafer ................ B65G 1/1378
                                                                414/268
9,188,982 B2 * 11/2015  Thomson ............. G05D 1/0212
(Continued)

FOREIGN PATENT DOCUMENTS

CN        102591332 A        7/2012
CN        102768537 A       11/2012
(Continued)

OTHER PUBLICATIONS

Bao et al., Landmark selection and path planning for unmanned vehicles with position error corrections, published Jun. 2023 elsevier.com, pp. 1-25 (pdf).*
(Continued)

*Primary Examiner* — Manglesh M Patel
(74) *Attorney, Agent, or Firm* — Oblon, McClelland, Maier & Neustadt, L.L.P.

(57) ABSTRACT

A path planning method for an unmanned device includes taking a current landmark as a current node, obtaining a landmark corresponding to a product to be picked with a route closest to the current node, and taking the obtained landmark as the current node, wherein an initial value of the current node is an initial landmark of the unmanned device; determining whether the current node is a landmark corresponding to the last product to be picked; if no, performing
(Continued)

the step of obtaining a landmark corresponding to a product to be picked with a route closest to the current node; and if yes, taking a route composed of the initial landmark of the unmanned device and landmarks corresponding to products to be picked that are selected sequentially as a travel route of the unmanned device.

15 Claims, 6 Drawing Sheets

(51) Int. Cl.
   *G06Q 10/047* (2023.01)
   *G06Q 10/0631* (2023.01)
   *G06Q 10/08* (2023.01)
(52) U.S. Cl.
   CPC ......... *G05D 1/0274* (2013.01); *G06Q 10/047* (2013.01); *G06Q 10/06315* (2013.01); *G06Q 10/06316* (2013.01); *G06Q 10/08* (2013.01)
(58) Field of Classification Search
   CPC ........... G06Q 10/047; G06Q 10/06315; G06Q 10/06316; G06Q 50/28; G06Q 10/08
   USPC ...................................................... 701/25, 26
   See application file for complete search history.

(56) References Cited

U.S. PATENT DOCUMENTS

| | | | |
|---|---|---|---|
| 10,150,564 B2* | 12/2018 | Porat | B65G 1/137 |
| 10,198,955 B1* | 2/2019 | Boyd | G06K 7/10861 |
| 10,241,516 B1* | 3/2019 | Brady | G05D 1/0027 |
| 10,308,430 B1* | 6/2019 | Brady | G05D 1/0022 |
| 10,373,097 B2* | 8/2019 | Kulkarni | G08G 5/0021 |
| 10,532,885 B1* | 1/2020 | Brady | G06Q 10/083 |
| 10,783,599 B1* | 9/2020 | Hartman | B60P 1/36 |
| 11,164,149 B1* | 11/2021 | Williams | B64C 39/02 |
| 11,341,858 B2* | 5/2022 | Priest | G08G 5/0082 |
| 2010/0070124 A1* | 3/2010 | Yeager | G05D 1/0022 |
| | | | 701/25 |
| 2010/0235032 A1* | 9/2010 | Sung | G05D 1/0246 |
| | | | 701/25 |
| 2011/0153136 A1 | 6/2011 | Anderson | |
| 2012/0166019 A1 | 6/2012 | Anderson | |
| 2012/0283906 A1 | 11/2012 | Anderson | |
| 2013/0238182 A1* | 9/2013 | Osagawa | G05D 1/0274 |
| | | | 701/26 |
| 2014/0032034 A1* | 1/2014 | Raptopoulos | H04B 7/18506 |
| | | | 701/25 |
| 2014/0277691 A1* | 9/2014 | Jacobus | B66F 9/24 |
| | | | 700/216 |
| 2016/0111006 A1* | 4/2016 | Srivastava | G08G 5/0069 |
| | | | 701/3 |
| 2016/0216711 A1* | 7/2016 | Srivastava | G08G 5/006 |
| 2018/0039282 A1* | 2/2018 | Gupta | G06Q 10/0833 |
| 2018/0118338 A1* | 5/2018 | Hunt | B64C 39/024 |
| 2018/0356823 A1* | 12/2018 | Cooper | G08G 5/0013 |
| 2019/0250636 A1* | 8/2019 | Szubbocsev | G05D 1/0225 |
| 2019/0266552 A1* | 8/2019 | Gupta | G06Q 30/0201 |
| 2019/0340938 A1* | 11/2019 | Aklilu | G08G 5/0021 |
| 2020/0039747 A1* | 2/2020 | Ahmann | G06Q 10/08 |
| 2020/0182634 A1* | 6/2020 | Karceski | G01S 17/86 |
| 2020/0312057 A1* | 10/2020 | Kumar | G01C 25/00 |
| 2020/0380876 A1* | 12/2020 | Sachdeva | G01C 21/383 |
| 2021/0020051 A1* | 1/2021 | Cao | G08G 5/0034 |
| 2021/0082034 A1* | 3/2021 | Zeng | G06Q 20/40155 |
| 2021/0114729 A1* | 4/2021 | Ragan | B64D 1/10 |
| 2021/0124376 A1* | 4/2021 | Edara | G05D 1/12 |
| 2021/0252705 A1* | 8/2021 | Liu | G06Q 10/047 |
| 2022/0221871 A1* | 7/2022 | Han | G01C 21/3658 |
| 2024/0004388 A1* | 1/2024 | Banerjee | G01C 21/383 |

FOREIGN PATENT DOCUMENTS

| | | |
|---|---|---|
| CN | 102955476 A | 3/2013 |
| CN | 106168803 A | 11/2016 |
| EP | 2 442 200 A2 | 4/2012 |

OTHER PUBLICATIONS

Cristiani et al., Inventory Management through Mini-Drones: Architecture and Proof-of-Concept Implementation, published 2020 IEEE, pp. 317-322.*

Kumar et al., Development of collision free path planning algorithm for warehouse mobile robot, published Jan. 2018 ScienceDirect, pp. 1-8 (pdf).*

Shorakaei et al., Optimal cooperative path planning of unmanned aerial vehicles by a parallel genetic algorithm, published Nov. 2014 Robotica Journal, pp. 1-9.*

Babel Luitpold, Flight path planning for unmanned aerial vehicles with landmark-based visual navigation, published 2013 Elsevier, pp. 1-9 (pdf).*

Singh et al., Landmark based path planning for UAVs in GPS-denied areas, published 2016 ScienceDirect, pp. 1-5 (pdf).*

Minghang Li et al., Dynamic path planning for multi-handling robots in warehousing system, 2020 IEEE, pp. 1-7 (pdf).*

Xin Chen et al., A Coordinated Path Planning Algorithm for Multi-Robot in Intelligent Warehouse, 2019 IEEE, pp. 2945-2950.*

Jiaxi Huo et al., Multi-Robot Path Planning in Narrow Warehouse Environments with Fast Feasibility Heuristics, Jul. 2022 IEEE Explore, pp. 1840-1845.*

International Search Report dated Oct. 28, 2019 in PCT/CN2019/099326 filed on Aug. 6, 2019, 2 pages.

* cited by examiner

PATH PLANNING METHOD AND DEVICE FOR UNMANNED DEVICE

CROSS-REFERENCE TO RELATED APPLICATIONS

The present application is based on and claims the benefit of priority to the China Patent Application No. 201811096783.2 filed on Sep. 20, 2018, which is hereby incorporated by reference herein in its entirety into the present application.

TECHNICAL FIELD

The present disclosure relates to the field of an unmanned device, and in particular to a path planning method and device for an unmanned device.

BACKGROUND

In production activities of a current warehouse, an automated device has been used on a large scale. For example, a picking operation in a warehouse is performed by using an unmanned device such as a drone and an unmanned vehicle. Moreover, whether the routing of an unmanned device within a warehouse is reasonable and whether route can be efficiently planned, have a great influence on the production efficiency within a warehouse.

SUMMARY

According to one aspect of the present disclosure, a path planning method for an unmanned device is provided. The method comprises: taking a current landmark as a current node, obtaining a landmark corresponding to a product to be picked with a route closest to the current node, and taking the obtained landmark corresponding to a product to be picked as the current node, wherein an initial value of the current node is an initial landmark of the unmanned device; determining whether the current node is a landmark corresponding to the last product to be picked; if YES, stopping performing the step of obtaining a landmark corresponding to a product to be picked with a route closest to the current node, and taking the obtained landmark corresponding to the product to be picked as the current node again; if NO, performing the step of obtaining a landmark corresponding to a product to be picked with a route closest to the current node, and taking the obtained landmark corresponding to the product to be picked as the current node repeatedly; and taking a route composed of the initial landmark of the unmanned device and landmarks corresponding to products to be picked that are selected sequentially as a travel path of the unmanned device.

In some embodiments, the method further comprises: determining a location of each landmark within a warehouse; mapping each landmark within the warehouse to a two-dimensional matrix map; determining a coordinate of the initial landmark of the unmanned device in the two-dimensional matrix map, and coordinates of the landmark corresponding to any one product to be picked in the two-dimensional matrix map; and calculating a route distance from the initial landmark of the unmanned device to the landmark corresponding to any one product to be picked, and a route distance between landmarks corresponding to any two products to be picked according to the coordinate values.

In some embodiments, the calculating a route distance from the initial landmark of the unmanned device to the landmark corresponding to anyone product to be picked comprises: calculating a coordinate distance the unmanned device and the landmark corresponding to any one product between the initial landmark of the unmanned device and the landmark corresponding to any one product to be picked in the two-dimensional matrix map; determining whether the initial landmark of the unmanned device and the landmark corresponding to any one product to be picked are located between the same two adjacent main lanes if the initial landmark of the unmanned device and the landmark corresponding to any one product to be picked are located in different shelf lanes; determining the number of first landmarks from the initial landmark of the unmanned device to the first main lane in the two adjacent main lanes, the number of second landmarks from the initial landmark of the unmanned device to the second main lane in the two adjacent main lanes, and determining the number of third landmarks from the landmark corresponding to anyone product to be picked to the first main lane, and the number of fourth landmarks from the landmark corresponding to any one product to be picked to the second main lane, and calculating a sum of the number of first landmarks and the number of third landmarks, and a sum of the number of second landmarks and the number of fourth landmarks if the initial landmark of the unmanned device and the landmark corresponding to any one product to be picked are located between the same two adjacent main lanes; and adding a value corresponding to a smaller sum of the numbers of landmarks in the two sums of the numbers of landmarks in the two-dimensional matrix map to the coordinate distance to obtain a route distance from the initial landmark of the unmanned device to the landmark corresponding to any one product to be picked.

In some embodiments, the coordinate distance is taken as the route distance from the initial landmark of the unmanned device to the landmark corresponding to any one product to be picked if the initial landmark of the unmanned device and the landmark corresponding to any one product to be picked are not located between the same two adjacent main lanes.

In some embodiments, the calculating a route distance between landmarks corresponding to any two products to be picked according to the coordinate values comprises: calculating a coordinate distance between landmarks corresponding to any two products to be picked in the two-dimensional matrix map; determining whether the landmarks corresponding to any two products to be picked are located between the same two adjacent main lanes if the landmarks corresponding to any two products to be picked are located in different shelf lanes; determining the number of first landmarks from the landmark corresponding to the first product to be picked in the any two products to be picked to the first main lane in the two adjacent main lanes, the number of second landmarks from the landmark corresponding to the first product to be picked to the second main lane in the two adjacent main lanes, and the number of third landmarks from the landmark corresponding to the second product to be picked in the any two products to be picked to the first main lane, and the number of fourth landmarks from the landmark corresponding to the second product to be picked to the second main lane; calculating a sum of the number of first landmarks and the number of third landmarks, and a sum of the number of second landmarks and the number of fourth landmarks if the landmarks corresponding to any two products to be picked are located between the same two adjacent main lanes and located in different shelf lanes; and adding a value corresponding to a smaller sum of the numbers of landmarks in the two sums of the numbers of landmarks in the two-dimensional matrix map to the coordinate distance to obtain a route distance between the landmarks corresponding to any two products to be picked.

In some embodiments, the coordinate distance is taken as the route distance between the landmarks corresponding to any two products to be picked if the landmarks corresponding to any two products to be picked are not located between the same two adjacent main lanes.

In some embodiments, the method further comprises selecting an optimal path among a plurality of travel paths according to an initial starting point of the next planned path if a plurality of travel paths of the unmanned device are selected.

In some embodiments, the selecting an optimal path among a plurality of travel paths according to an initial starting point of the next planned path comprises: selecting a travel path among a plurality of travel paths, where the landmark corresponding to the last product to be picked is closest to an initial starting point of the next planned path, as the optimal path.

In some embodiments, the method further comprises: selecting a travel path among a plurality of travel paths, where the landmark corresponding to the last product to be picked is closest to the initial landmark, as an optimal path, if the next step is routed for the unmanned device to return to the initial landmark.

According to another aspect of the present disclosure, a path planning device for an unmanned device is further provided. The method comprises: a landmark obtaining unit configured to take a current landmark as a current node, obtain a landmark corresponding to a product to be picked with a route closest to the current node, and take the obtained landmark corresponding to the product to be picked as a current node, wherein an initial value of the current node is an initial landmark of the unmanned device; determine whether the current node is a landmark corresponding to the last product to be picked; if YES, stop performing the step of obtaining a landmark corresponding to a product to be picked with a route closest to the current node, and taking the obtained landmark corresponding to the product to be picked as the current node again; if NO, perform the step of obtaining a landmark corresponding to a product to be picked with a route closest to the current node, and taking the obtained landmark corresponding to the product to be picked as the current node repeatedly; and a travel path determining unit configured to take a route composed of the initial landmark of the unmanned device and landmarks corresponding to products to be picked that are selected sequentially as a travel path of the unmanned device.

In some embodiments, the device further comprises: a landmark location determining unit configured to determine a location of each landmark within a warehouse; and a route distance determining unit configured to map each landmark within the warehouse to a two-dimensional matrix map; determine a coordinate of the initial landmark of the unmanned device in the two-dimensional matrix map, and coordinates of the landmark corresponding to any one product to be picked in the two-dimensional matrix map; calculate a route distance from the initial landmark of the unmanned device to the landmark corresponding to any one product to be picked, and a route distance between landmarks corresponding to any two products to be picked, according to the coordinate values.

In some embodiments, the route distance determining unit is configured to: calculate a coordinate distance between the initial landmark of the unmanned device and the landmark corresponding to any one product to be picked in the two-dimensional matrix map; determine whether the initial landmark of the unmanned device and the landmark corresponding to any one product to be picked are located between the same two adjacent main lanes if the initial landmark of the unmanned device and the landmark corresponding to any one product to be picked are located in different shelf lanes; determine the number of first landmarks from the initial landmark of the unmanned device to the first main lane in the two adjacent main lanes, the number of second landmarks from the initial landmark of the unmanned device to the second main lane in the two adjacent main lanes, and determine the number of third landmarks from the landmark corresponding to any one product to be picked to the first main lane, and the number of fourth landmarks from the landmark corresponding to any one product to be picked to the second main lane, and calculate a sum of the number of first landmarks and the number of third landmarks, and a sum of the number of second landmarks and the number of fourth landmarks if the initial landmark of the unmanned device and the landmark corresponding to any one product to be picked are located between the same two adjacent main lanes; add a value corresponding to a smaller sum of the numbers of landmarks in the two sums of the numbers of landmarks in the two-dimensional matrix map to the coordinate distance to obtain the route distance from the initial landmark of the unmanned device to the landmark corresponding to the product to be picked.

In some embodiments, the route distance determining unit is further configured to take the coordinate distance as the route distance from the initial landmark of the unmanned device to the landmark corresponding to any one product to be picked if the initial landmark of the unmanned device and the landmark corresponding to any one product to be picked are not located between the same two adjacent main lanes.

In some embodiments, the route distance determining unit is configured to: calculate a coordinate distance between landmarks corresponding to any two products to be picked in the two-dimensional matrix map; determine whether the landmarks corresponding to any two products to be picked are located between the same two adjacent main lanes if the landmarks corresponding to any two products to be picked are located in different shelf lanes; determine the number of first landmarks from a landmark corresponding to the first product to be picked in the any two products to be picked to the first main lane in the two adjacent main lanes, the number of second landmarks from a landmark corresponding to the first product to be picked to the second main lane in the two adjacent main lanes, and the number of third landmarks from a landmark corresponding to the second product to be picked in the any two products to be picked to the first main lane, and the number of fourth landmarks from a landmark corresponding to the second product to be picked to the second main lane; calculate a sum of the number of first landmarks and the number of third landmarks, and a sum of the number of second landmarks and the number of fourth landmarks if the landmarks corresponding to any two products to be picked are located between the same two adjacent main lanes and located in different shelf lanes; add a value corresponding to a smaller sum of the numbers of landmarks in the two sums of the numbers of landmarks in the two-dimensional matrix map to the coordinate distance to obtain a route distance between the landmarks corresponding to any two products to be picked.

In some embodiments, the route distance determining unit is further configured to take the coordinate distance as the route distance between the landmarks corresponding to any two products to be picked if the landmarks corresponding to any two products to be picked are not located between the same two adjacent main lanes.

In some embodiments, the device further comprises: an optimal path determining unit configured to select an optimal path among a plurality of travel paths according to an initial starting point of the next planned path if a plurality of travel paths of the unmanned device are selected.

In some embodiments, the optimal path determining unit is configured to select a travel path among a plurality of travel paths, where the landmark corresponding to the last product to be picked is closest to the initial starting point of the next planned path, as an optimal path.

In some embodiments, the optimal path determining unit is configured to select a travel path among a plurality of travel paths, where the landmark corresponding to the last product to be picked is closest to the initial landmark, as an optimal path, if the next step is routed for the unmanned device to return to the initial landmark.

According to another aspect of the present disclosure, a path planning device for an unmanned device is further provided. The device comprises: a memory; and a processor coupled to the memory, wherein the processor is configured to execute the above-described path planning method for an unmanned device based on instructions stored in the memory.

According to another aspect of the present disclosure, a computer readable storage medium is provided. The computer readable storage medium stores computer program instructions which, when executed by a processor, implement the above-described path planning method for an unmanned device is provided.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

DETAILED DESCRIPTION

Various exemplary embodiments of the present disclosure will now be described in detail with reference to the accompanying drawings. It should be noted that: unless additionally specified, the relative arrangements, numerical expressions and numerical values of the components and steps expounded in these examples do not limit the scope of the present disclosure.

At the same time, it should be understood that, in order to facilitate the description, the dimensions of various parts shown in the drawings are not delineated according to actual proportional relations.

The following descriptions of at least one exemplary embodiment which are in fact merely descriptive, by no means serve as any delimitation on the present disclosure as well as its application or use.

The techniques, methods, and apparatuses known to a common technical person in the relevant art may not be discussed in detail, but where appropriate, techniques, methods, and apparatuses should be considered as part of the granted description.

Among all the examples shown and discussed here, any specific value should be construed as being merely illustrative, rather than as a delimitation. Thus, other examples of exemplary embodiments may have different values.

It should be noted that similar reference signs and letters present similar items in the following drawings, and therefore, once an item is defined in a drawing, there is no need for further discussion in the subsequent drawings.

In order to make the object, technical solution, and advantages of the present disclosure clear and explicit, the present disclosure will be further described in detail in conjunction with the specific embodiments and with reference to the drawings.

Figure 1:
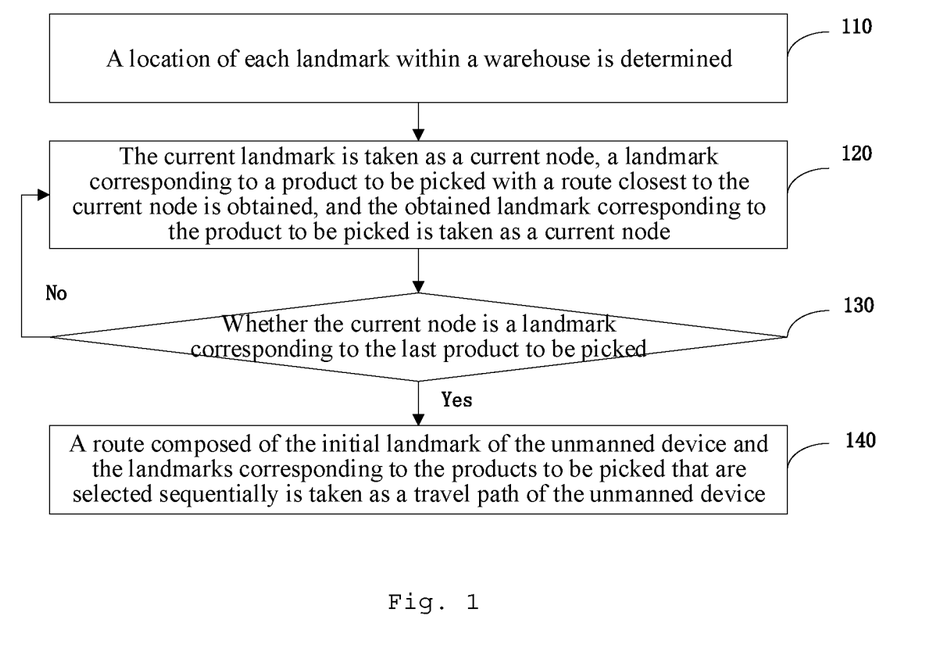
FIG. 1 is a schematic flowchart of some embodiments of a path planning method for an unmanned device of the present disclosure.

FIG. 1 is a schematic flowchart of some embodiments of a path planning method for an unmanned device of the present disclosure.

Figure 2:
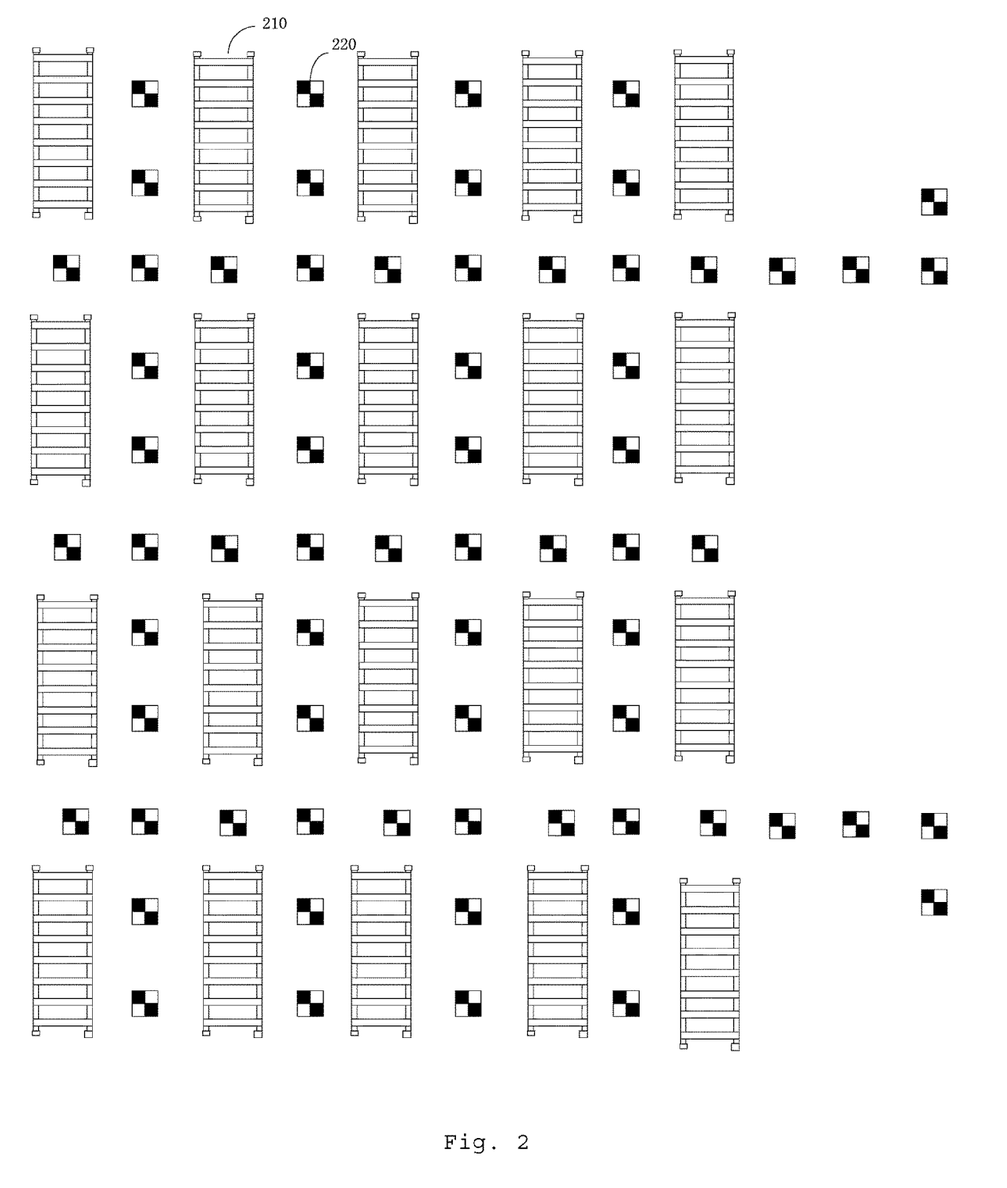
FIG. 2 is a schematic view of a landmark travelled by the unmanned device in the present disclosure.

In step 110, a location of each landmark within a warehouse is determined. As shown in FIG. 2, 210 is a shelf and 220 is a landmark, wherein the landmark may comprise a shelf landmark and a main lane landmark, and the unmanned device travels along landmarks within the warehouse. It is possible to determine a current location of the unmanned device by the landmark travelled, and thus determine a next travel direction.

Figure 3:
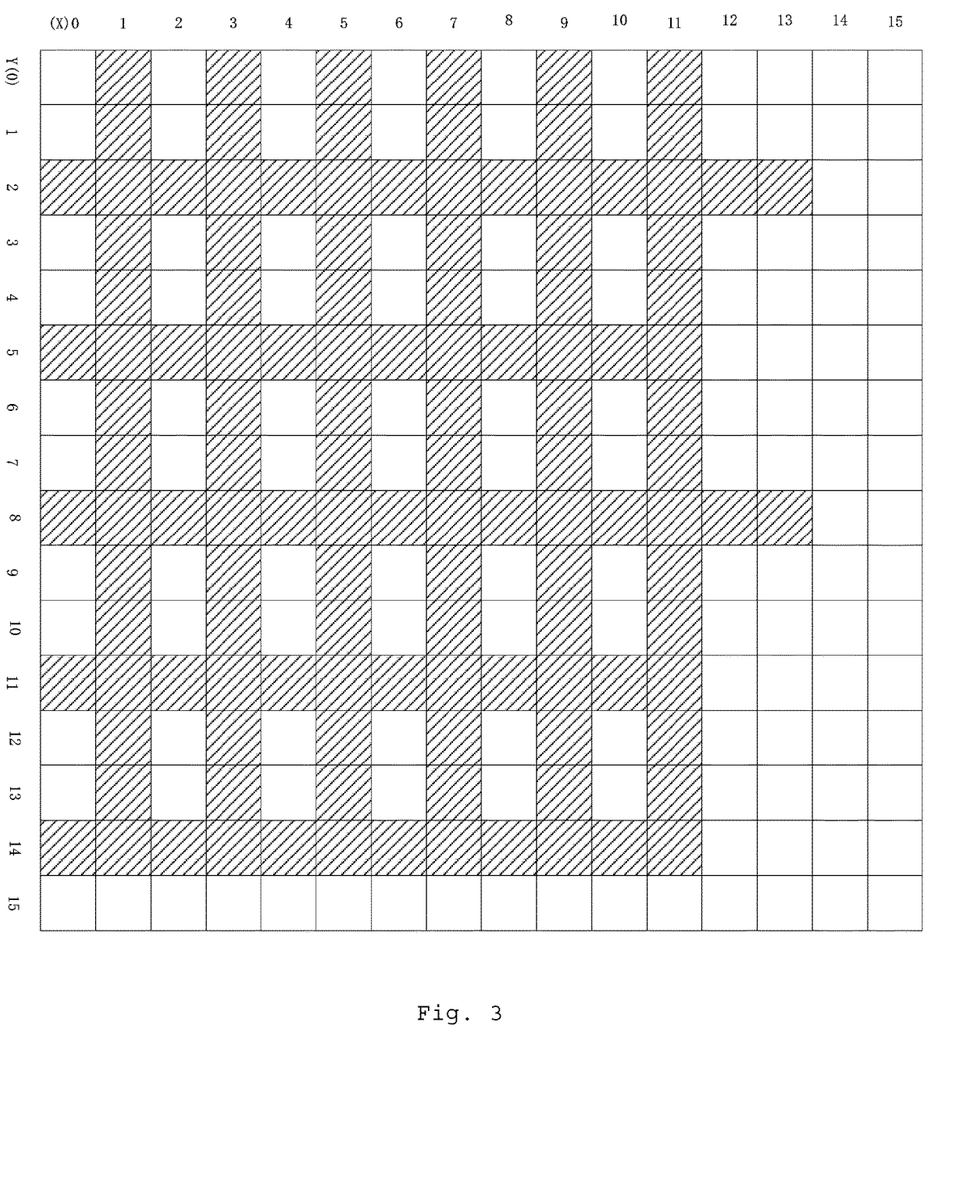
FIG. 3 is a schematic view of a two-dimensional matrix map of the unmanned device of the present disclosure.

In step 120, the current landmark is taken as a current node, a landmark corresponding to a product to be picked with a route closest to the current node is obtained, and the obtained landmark corresponding to the product to be picked is taken as the current node, wherein an initial value of the current node is the initial landmark of the unmanned device. As shown in FIG. 3, each landmark within the warehouse may be mapped to a two-dimensional matrix map, in which blocks filled with stripes are landmarks, and blank blocks are specific objects or open spaces. determine coordinate values of an initial landmark of the unmanned device in the two-dimensional matrix map, as well as coordinate values of a landmark corresponding to any one product to be picked in the two-dimensional matrix map are determined; and a route distance from the initial landmark of the unmanned device to the landmark corresponding to any one product to be picked, and a route distance between landmarks corresponding to any two products to be picked according to the coordinate values are calculated.

In step 130, it is determined whether the current node is a landmark corresponding to the last product to be picked. If YES, perform step 140; if NO, perform step 120. That is, it is determine whether the landmarks corresponding to all the products to be picked have been obtained. If the landmarks corresponding to all the products to be picked have not been obtained, continue to perform step 120 until a landmark corresponding to the last product to be picked is obtained.

In step 140, a route composed of the initial landmark of the unmanned device and the landmarks corresponding to the products to be picked that are selected sequentially is taken as a travel path of the unmanned device, wherein a plurality of travel paths might be formed.

In some embodiments, the initial landmark of the unmanned device is taken as a starting point to sequentially obtain the landmarks corresponding to the products to be picked, and a route composed of the obtained landmarks is taken as a travel path of the unmanned device, so that it is possible to rapidly plan the travel path of the unmanned device within the warehouse.

In some embodiments, according to the coordinate values, the route distance from the initial landmark of the unmanned device to a landmark corresponding to each product to be picked may be calculated by: calculating a coordinate distance between the initial landmark of the unmanned device and the landmark corresponding to any one product to be picked in the two-dimensional matrix map; taking the coordinate distance as the route distance from the initial landmark of the unmanned device to the landmark corresponding to any one product to be picked if the initial landmark of the unmanned device and the landmark corresponding to any one product to be picked are not located between the same two adjacent main lanes; determining the number of first landmarks from the initial landmark of the unmanned device to the first main lane in the two adjacent main lanes, the number of second landmarks from the initial landmark of the unmanned device to the second main lane in the two adjacent main lanes, and determining the number of third landmarks from the landmark corresponding to any one product to be picked to the first main lane, and the number of fourth landmarks from the landmark corresponding to any one product to be picked to the second main lane, and calculating a sum of the number of first landmarks and the number of third landmarks, and a sum of the number of second landmarks and the number of fourth landmarks if the initial landmark of the unmanned device and the landmark corresponding to any one product to be picked are located between the same two adjacent main lanes and located in different shelf lanes; adding a value corresponding to a smaller sum of the numbers of landmarks in the two sums of the numbers of landmarks in the two-dimensional matrix map to the coordinate distance to obtain a route distance from the initial landmark of the unmanned device to the landmark corresponding to any one product to be picked.

In some embodiments, according to the coordinate values, the route distance between landmarks corresponding to any two products to be picked are calculated for example by: calculating a coordinate distance between landmarks corresponding to any two products to be picked in the two-dimensional matrix map; taking the coordinate distance as the route distance between landmarks corresponding to any two products to be picked if the landmarks corresponding to any two products to be picked are not located between the same two adjacent main lanes or are located in the same shelf vane; determining the number of first landmarks from a landmark corresponding to the first product to be picked in the any two products to be picked to the first main lane in the two adjacent main lanes, the number of second landmarks from a landmark corresponding to the first product to be picked to the second main lane in the two adjacent main lanes, and the number of third landmarks from a landmark corresponding to the second product to be picked in the any two products to be picked to the first main lane, and the number of fourth landmarks from a landmark corresponding to the second product to be picked to the second main lane, and calculating a sum of the number of first landmarks and the number of third landmarks, and a sum of the number of second landmarks and the number of fourth landmarks if the landmarks corresponding to any two products to be picked are located between the same two adjacent main lanes and located in different shelf lanes; adding a value corresponding to a smaller sum of the numbers of landmarks in the two sums of the numbers of landmarks in the two-dimensional matrix map to the coordinate distance to obtain a route distance between landmarks corresponding to two products to be picked.

In some embodiments, the coordinates of the initial landmark of the unmanned device and the landmark corresponding to any one product to be picked in the two-dimensional matrix map may be expressed as [X, Y, whether a cross lane or not, landmark KEY, north landmark KEY, south_landmark KEY, west landmark KEY, east_Landmark KEY, up_number of landmarks, down_number of landmarks], wherein, if the landmark where the unmanned device is located is marked as a cross lane in the two-dimensional matrix map, it is indicated that the unmanned device may move in any direction. Since the landmark KEY is an identifier of the landmark, the coordinates [X, Y] of the landmark in the two-dimensional matrix map may be retrieved according to the landmark KEY. The coordinates [X, Y] of the landmark in the two-dimensional matrix map may also be determined according to [north landmark KEY, south landmark KEY, west landmark KEY, east_landmark KEY, up_number of landmarks]. The numbers after KEY_ are unique codes, which may be sequential or not, where KEY is Null, it is indicated that the corresponding landmark is empty, that is, a physical object or an open space. The up_number of landmarks represents the number of landmarks from the coordinates [X, Y] to the closest main lane in a positive direction of the Y-axis, and the down_number of landmarks represents the number of landmarks from the coordinates [X, Y] to the closest main lane in a negative direction of the Y-axis. This parameter is used to decide a direction in which the unmanned device may move so as to reach the main lane fastest.

The formula for calculating the route distance from the initial landmark of the unmanned device to the landmark corresponding to any one product to be picked, or the route distance between landmarks corresponding to any two products to be picked may be expressed as $|X1-X2|+|Y1-Y2|+M$, where $(X1, Y1)$ and $(X2, Y2)$ are two landmark points. When the two landmark points are located in different shelf lanes and both of them are between the same two adjacent main lanes, then the two points cannot be reached directly, and the unmanned device can only move to a target landmark point through a main lane path. Therefore, it is necessary to make a statistic of the values of the numbers of landmarks when moving from the two landmark points to the same lane. It is possible to make a statistic according to the number of landmarks when moving up to the main lane or the number of landmarks when moving down to the main lane, where a sum of the two numbers is M. If the two points are within two different shelf lanes and both of them are not between the same two adjacent main lanes, M is 0.

Figure 4:
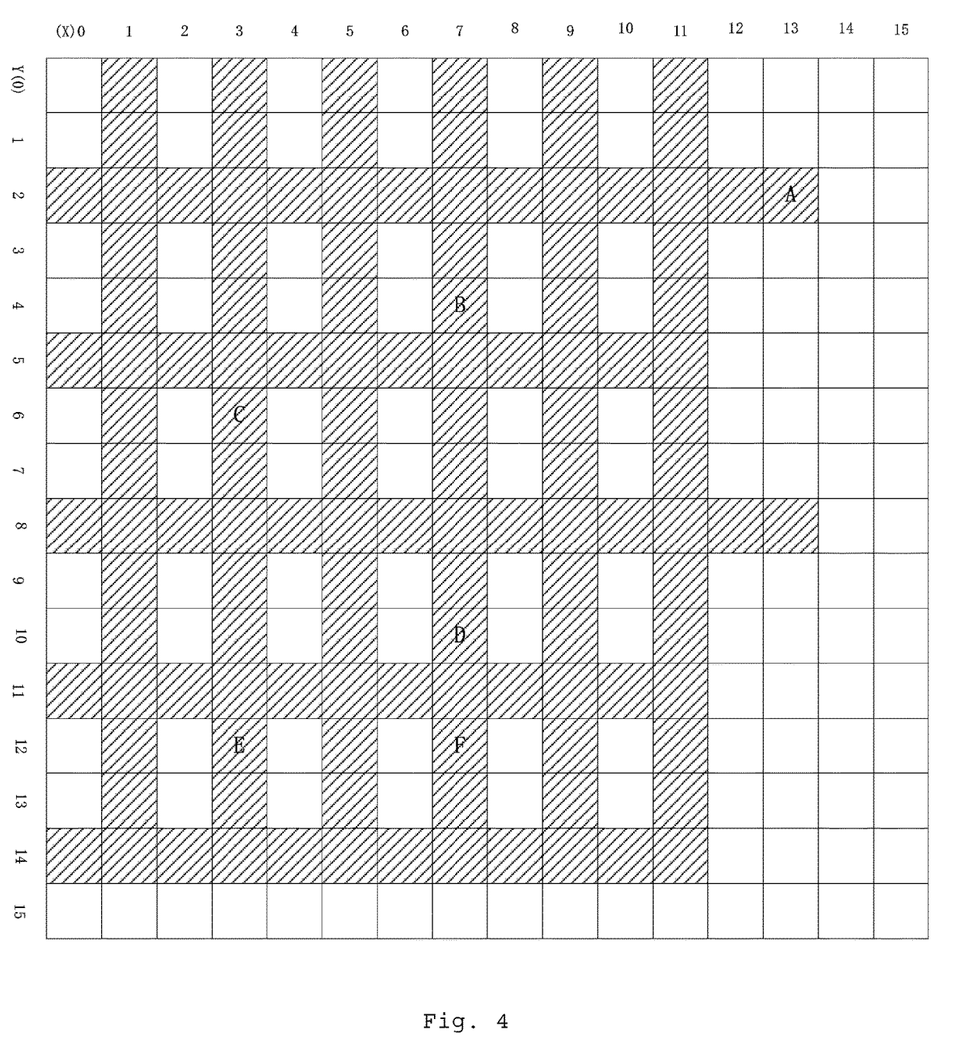
FIG. 4 is a schematic view of a logistics map in some embodiments of the present disclosure.

For example, as shown in FIG. 4, the coordinates of the initial landmark A of the unmanned device in the two-dimensional matrix map are [13, 2, NO, KEY_000012, north_KEY_000032, south_KEY_000075, west_KEY_000045, east_KEY_000047, 0, 0]; the coordinates of the landmark corresponding to product B in the two-dimensional matrix map are [7, 4, NO, KEY_000112, north_KEY_000099, south_KEY_000138, west_KEY_000111, east_KEY_000113, 2, 1]; The coordinates of the landmark corresponding to the product C in the two-dimensional matrix map are [3, 6, NO, KEY_000164, north_KEY_000145, south_KEY_000178, west_KEY_000161, east_KEY_000165, 1, 2]; the coordinates of the landmark corresponding to the product D is in two-dimensional matrix map are [7, 10, NO, KEY_000164, north_KEY_000145, south_KEY_000178, west_KEY_000161, east_KEY_000165, 2, 1]; the coordinates of the landmark corresponding to the product E in the two-dimensional matrix map are [3, 12, No, KEY_000197, north_KEY_000173, south_KEY_000219, west_KEY_000196, east_KEY_000198, 1, 2]; the coordinates of the landmark corresponding to the product F in the two-dimensional matrix map are [7, 12, No, KEY_000210, north_KEY_000199, south_KEY_000225, west_KEY_000207, east_KEY_000212, 1, 2]. Table 1 shows the route distance from the initial landmark of the unmanned device to the landmark corresponding to any one product to be picked, and the route distance between landmarks corresponding to any two products to be picked.

TABLE 1

| | | |
|---|---|---|
| A[13, 2] | B[7, 4] | \|13 − 7\| + \|2 − 4\| + 0 = 6 + 2 = 8 |
| A[13, 2] | C[3, 6] | \|13 − 3\| + \|2 − 6\| + 0 = 10 + 4 = 14 |
| A[13, 2] | D[7, 10] | \|13 − 7\| + \|2 − 10\| + 0 = 6 + 8 = 14 |
| A[13, 2] | E[3, 12] | \|13 − 3\| + \|2 − 12\| + 0 = 10 + 10 = 20 |
| A[13, 2] | F[7, 12] | \|13 − 7\| + \|2 − 12\| + 0 = 6 + 10 = 16 |
| B[7, 4] | C[3, 6] | \|7 − 3\| + \|4 − 6\| + 0 = 4 + 2 = 6 |
| B[7, 4] | D[7, 10] | \|7 − 7\| + \|4 − 10\| + 0 = 0 + 6 = 6 |
| B[7, 4] | E[3, 12] | \|7 − 3\| + \|4 − 12\| + 0 = 4 + 8 = 12 |
| B[7, 4] | F[7, 12] | \|7 − 7\| + \|4 − 12\| + 0 = 0 + 8 = 8 |
| C[3, 6] | D[7, 10] | \|3 − 7\| + \|6 − 10\| + 0 = 4 + 4 = 8 |
| C[3, 6] | E[3, 12] | \|3 − 3\| + \|6 − 12\| + 0 = 0 + 6 = 6 |
| C[3, 6] | F[7, 12] | \|3 − 7\| + \|6 − 12\| + 0 = 4 + 6 = 10 |
| D[7, 10] | E[3, 12] | \|7 − 3\| + \|10 − 12\| + 0 = 4 + 2 = 6 |
| D[7, 10] | F[7, 12] | \|7 − 7\| + \|10 − 12\| + 0 = 0 + 2 = 2 |
| E[3, 12] | F[7, 12] | \|3 − 7\| + \|12 − 12\| + (1 + 1) = 4 + 0 + 2 = 6 |

The landmarks corresponding to the products may be selected sequentially from the route distances calculated in Table 1. First, the starting point [A(0), ALL(0)] is selected, where the value within the brackets of ALL ( ) is a route distance, and the value in the alphabet brackets is a route distance between the landmark and a previous landmark. If the landmark is the initial landmark, the value in the alphabet brackets is 0.

Second, starting from the point A, the landmark with a route closest to the point A is obtained, i.e. the point B, to form a landmark list [A(0), B(8), ALL(8)], where B(8) means that the route distance between the point B and the point A is 8.

Third, starting from the point B, the landmark with a route closest to the point B is obtained. Since the route distance between the point C or D and the point B is 6, two routes are formed, that is, [A(0), B(8), C(6), ALL(14)] and [A(0), B(8), D(6), ALL(14)].

Fourth, corresponding next points with the closest distance are respectively selected for the two routes, that is, [A(0), B(8), C(6), E(6), ALL(20)] and [A(0), B(8), D(6), F(2), ALL(16)].

Fifth, corresponding next points with the closest distance are respectively selected for the two routes, where the distances from E to D and F are the same. Thus, three routes are formed, that is, [A(0), B(8), C(6), E(6), D(6), ALL(26)], [A(0), B(8), C(6), E(6), F(6), ALL(26)] and [A(0), B(8), D(6), F(2), E(6), ALL(22)].

Sixth, the last landmark is obtained, namely [A(0), B(8), C(6), E(6), D(6), F(2), ALL(28)], [A(0), B(8), C(6), E(6), F(6), D(2), ALL(28)] and [A(0), B(8), D(6), F(2), E(6), C(6), ALL(28)].

By way of the above-described steps, a travel path of the unmanned device may be determined. From the sixth step, it may be seen that the formed three routes have the same length. Therefore, an optimal path among a plurality of travel paths may be selected according to an initial starting point of the next planned path. It is possible that, a travel path among a plurality of travel paths, where the landmark corresponding to the last product to be picked is closest to an initial starting point of the next planned path, is selected as the optimal path. For example, if the next step is routed for the unmanned device to return to the initial landmark, a travel path among a plurality of travel paths, where the landmark corresponding to the last product to be picked is closest to the initial landmark, is selected as the optimal path. If it is also necessary to perform the next task after the picking task is completed, the last point may be taken as a starting point of the next task according to an overall layout of the next task.

In the above-described embodiments, when the travel of the unmanned device is routed, calculation is performed directly based on the coordinate values of the two-dimensional matrix map, so that the calculation logic is simpler with lower complexity and smaller requirements for the computing capability of the hardware. When the shelves and landmarks within the warehouse increase or decrease, the modification to the entire map may be accomplished by traversing and modifying the coordinates.

Figure 5:
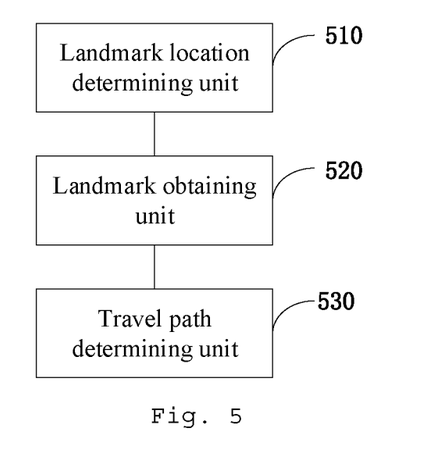
FIG. 5 is a schematic structural view of some embodiments of a path planning device for an unmanned device of the present disclosure.

FIG. 5 is a schematic structural view of some embodiments of a path planning device for an unmanned device of the present disclosure. The device comprises a landmark location determining unit 510, a landmark obtaining unit 520, and a travel path determining unit 530.

The landmark location determining unit 510 is configured to determine a location of each landmark within a warehouse, wherein the landmarks may comprise a shelf landmark and a main lane landmark. The unmanned device travels along the landmarks within the warehouse, such that it is possible to determine a current location of the unmanned device according to a landmark and thus determine a next travel direction.

The landmark obtaining unit 520 is configured to take a current landmark is taken as a current node, obtain a landmark corresponding to a product to be picked with a route closest to the current node, and take the obtained landmark corresponding to the product to be picked as a current node, wherein an initial value of the current node is an initial landmark of the unmanned device; determine whether the current node is a landmark corresponding to the last product to be picked; if YES, stop performing the step of obtaining a landmark corresponding to the product to be picked with a route closest to the current node, and taking the obtained landmark corresponding to the product to be picked as the current node again; if NO, perform the step of obtaining a landmark corresponding to a product to be picked with a route closest to the current node, and taking the obtained landmark corresponding to the product to be picked as the current node repeatedly.

The travel path determining unit 530 is configured to take a route composed of the initial landmark of the unmanned device and landmarks corresponding to products to be picked that are selected sequentially as a travel path of the unmanned device.

In this embodiment, the initial landmark of the unmanned device is taken as a starting point to sequentially obtain landmarks corresponding to products to be picked, and a route composed of the landmarks is taken as a travel path of the unmanned device, so that it is possible to rapidly route the travel of the unmanned device within the warehouse.

Figure 6:
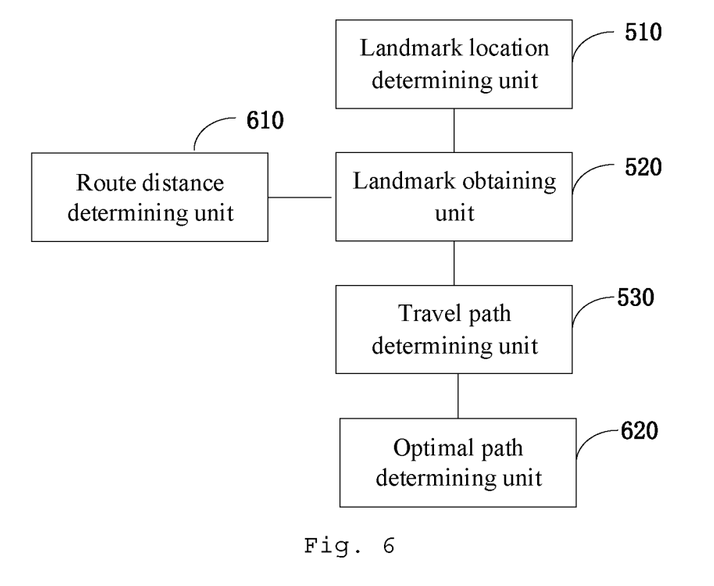
FIG. 6 is a schematic structural view of other embodiments of a path planning device for an unmanned device of the present disclosure.

FIG. 6 is a schematic structural view of other embodiments of a path planning device for an unmanned device of the present disclosure. The device comprises a route distance determining unit 610 configured to map a location of each landmark within the warehouse to a two-dimensional matrix map; determine a coordinate of the initial landmark of the unmanned device in the two-dimensional matrix map, and coordinates of the landmark corresponding to any one product to be picked in the two-dimensional matrix map; calculate a route distance from the initial landmark of the unmanned device to the landmark corresponding to any one product to be picked, and a route distance between landmarks corresponding to any two products to be picked according to the coordinate values.

In some embodiments, the route distance determining unit 610 is configured to: calculate a coordinate distance between the initial landmark of the unmanned device and the landmark corresponding to any one product to be picked in the two-dimensional matrix map; determine whether the initial landmark of the unmanned device and the landmark corresponding to any one product to be picked are located between the same two adjacent main lanes; determine the number of first landmarks from the initial landmark of the unmanned device to the first main lane in the same two adjacent main lanes, the number of second landmarks from the initial landmark of the unmanned device to the second main lane in the same two adjacent main lanes, and determine the number of third landmarks from the landmark corresponding to any one product to be picked to the first main lane, and the number of fourth landmarks from the landmark corresponding to any one product to be picked to the second main lane, and calculate a sum of the number of first landmarks and the number of third landmarks, and a sum of the number of second landmarks and the number of fourth landmarks if the initial landmark of the unmanned device and the landmark corresponding to any one product to be picked are located between the same two adjacent main lanes; add a value corresponding to a smaller sum of the numbers of landmarks in the two sums of the numbers of landmarks in the two-dimensional matrix map to the coordinate distance to obtain a route distance from the initial landmark of the unmanned device to the landmark corresponding to any one product to be picked. The coordinate distance is taken as the route distance from an initial landmark of the unmanned device to a landmark corresponding to any one product to be picked if the initial landmark of the unmanned device and a landmark corresponding to a product to be picked are not located between the same two adjacent main lanes.

In some embodiments, the route distance determining unit 610 is configured to: calculate a coordinate distance between landmarks corresponding to any two products to be picked in the two-dimensional matrix map; determine whether the landmarks corresponding to any two products to be picked are not located between the same two adjacent main lanes; determine the number of first landmarks from a landmark corresponding to the first product to be picked in the any two products to be picked to the first main lane in the same two adjacent main lanes, the number of second landmarks from a landmark corresponding to the first product to be picked to the second main lane in the same two adjacent main lanes, and the number of third landmarks from a landmark corresponding to the second product to be picked in the any two products to be picked to the first main lane, and the number of fourth landmarks from a landmark corresponding to the second product to be picked to the second main lane; calculate a sum of the number of first landmarks and the number of third landmarks, and a sum of the number of second landmarks and the number of fourth landmarks if the landmarks corresponding to any two products to be picked are located between the same two adjacent main lanes and located in different shelf lanes; add a value corresponding to a smaller sum of the numbers of landmarks in the two sums of the numbers of landmarks in the two-dimensional matrix map to the coordinate distance to obtain a route distance between the landmarks corresponding to any two products to be picked. The coordinate distance is taken as a route distance between the landmarks corresponding to any two products to be picked if landmarks corresponding to two products to be picked are not located between the same two adjacent main lanes.

In other embodiments of the present disclosure, the device further comprises an optimal path determining unit 620 configured to select an optimal path among a plurality of travel paths according to an initial starting point of the next planned path if a plurality of travel paths of the unmanned device are selected. For example, it is possible that, a travel path among a plurality of travel paths, where the landmark corresponding to the last product to be picked is closest to an initial starting point of the next planned path, is selected as an optimal path. If the next step is routed for the unmanned device to return to the initial landmark, a travel path among a plurality of travel paths, where the landmark corresponding to the last product to be picked is closest to the initial landmark, is selected as an optimal path. If it is also necessary to perform the next task after the picking task is completed, the last point may be taken as a starting point of the next task according to an overall layout of the next task.

In the above-described embodiments, when the travel of the unmanned device is routed, calculation is performed directly based on the coordinate values of the two-dimensional matrix map, so that the calculation logic is simpler with lower complexity and smaller requirements for the computing capability of the hardware. When the shelves and landmarks within the warehouse increase or decrease, the modification to the entire map may be accomplished by traversal and modification of the coordinates.

Figure 7:
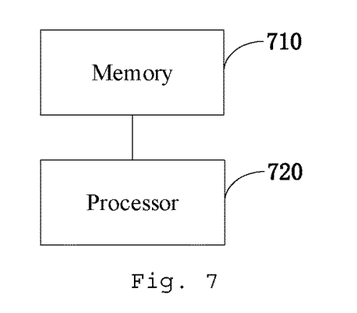
FIG. 7 is a schematic structural view of still other embodiments of a path planning device for an unmanned device of the present disclosure.

FIG. 7 is a schematic structural view of still other embodiments of a path planning device for an unmanned device of the present disclosure. The device comprises a memory 710 and a processor 720, wherein the memory 710 may be a magnetic disk, a flash memory, or any other non-volatile storage medium. The memory is configured to store instructions in the embodiment corresponding to FIG. 1. The processor 720 which is coupled to the memory 710, may be implemented as one or more integrated circuits, such as a microprocessor or a microcontroller. The processor 720 is configured to execute instructions stored in the memory.

Figure 8:
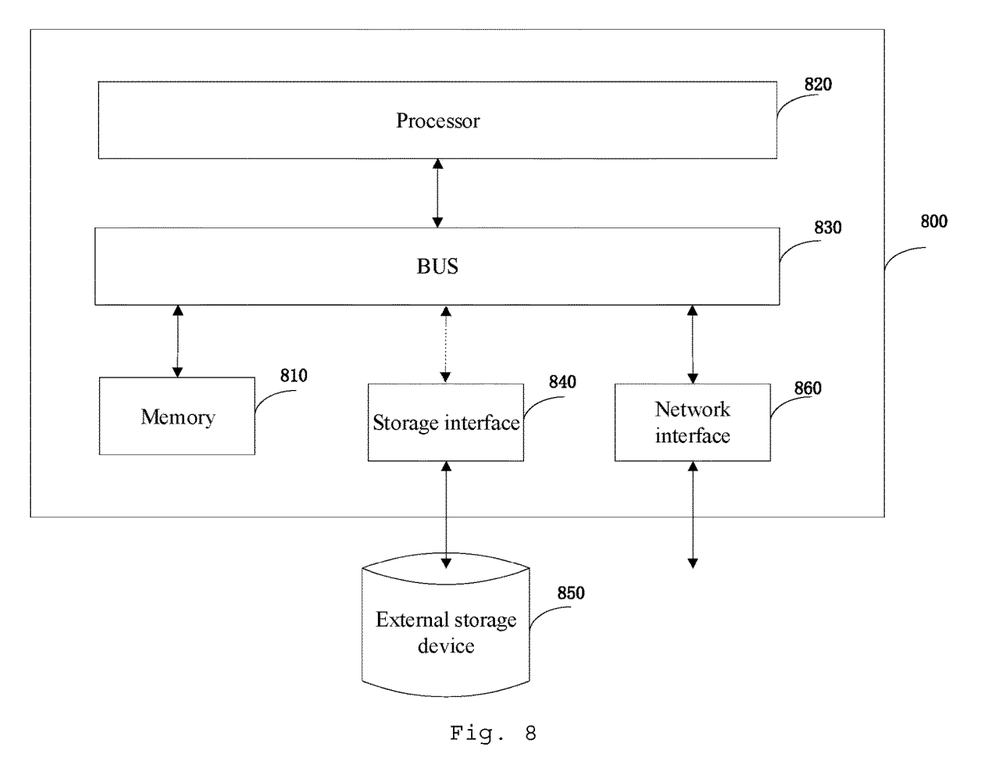
FIG. 8 is a schematic structural view of yet still other embodiments of a path planning device for an unmanned device of the present disclosure.

In some embodiments, it is also possible that as shown in FIG. 8, the device 800 comprises a memory 810 and a processor 820. The processor 820 is coupled to the memory 810 through the BUS 830. The device 800 may also be connected to an external storage device 850 through the storage interface 840 so as to call external data, and may also be connected to a network or another computer system (not shown) through the network interface 860, which will not be introduced in detail here.

In this embodiment, data instructions are stored by the memory, such that the above-described instructions are processed by the processor. The initial landmark of the unmanned device is taken as a starting point to sequentially obtain landmarks corresponding to products to be picked, and a route composed of the landmarks is taken as a travel path of the unmanned device so that it is possible to rapidly route the travel of the unmanned device within the warehouse.

In other embodiments, a computer readable storage medium is stored with computer program instructions thereon, such that the steps of the method in the embodiments corresponding to FIG. 1 are implemented when the instructions are executed by a processor. Those skilled in the art will appreciate that the embodiments of the present disclosure may be provided as a method, device, or computer program product. Accordingly, the present disclosure may take the form of an entirely hardware embodiment, an entirely software embodiment, or a combination of software and hardware aspects. Moreover, the present disclosure may take the form of a computer program product embodied in one or more computer-usable non-transient storage media (comprising but not limited to disk memory, CD-ROM, optical memory, and the like) containing computer usable program codes therein.

The present disclosure is described with reference to the flow charts and/or block diagrams of methods, devices (systems), and computer program products according to the embodiments of the present disclosure. It will be understood that each step and/or block of the flow charts and/or block diagrams as well as a combination of steps and/or blocks of the flow charts and/or block diagrams may be implemented by a computer program instruction. These computer program instructions may be provided to a processor of a general purpose computer, special purpose computer, an embedded processing machine, or other programmable data processing devices to produce a machine, such that the instructions performed by a processor of a computer or other programmable data processing devices produce a device for realizing a function designated in one or more steps of a flow chart and/or one or more blocks in a block view.

These computer program instructions may also be stored in a computer readable memory that may guide a computer or other programmable data processing device to operate in a particular manner, such that the instructions stored in the computer readable memory produce a manufacture comprising an instruction device. The instruction device realizes a function designated in one or more steps in a flow chart or one or more blocks in a block view.

These computer program instructions may also be loaded onto a computer or other programmable data processing devices, such that a series of operational steps are performed on a computer or other programmable device to produce a computer-implemented processing, such that the instructions performed on a computer or other programmable devices provide steps for realizing a function designated in one or more steps of the flow chart and/or one or more blocks in the block view.

Heretofore, the present disclosure has been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments may be made without departing from the scope and spirit of the present disclosure. The scope of the present disclosure is defined by the appended claims.

What is claimed is:

1. A path planning method for an unmanned device, comprising:
   determining a location of each landmark within a warehouse;
   mapping each landmark within the warehouse to a two-dimensional matrix map;
   determining a coordinate of an initial landmark of the unmanned device in the two-dimensional matrix map, and coordinates of a landmark corresponding to any one product to be picked in the two-dimensional matrix map;
   calculating a route distance from the initial landmark of the unmanned device to the landmark corresponding to the any one product to be picked and a route distance between landmarks corresponding to any two products to be picked according to coordinate values;
   taking a current landmark as a current node, obtaining a landmark corresponding to a product to be picked with a route closest to the current node, and taking the obtained landmark corresponding to the product to be picked as the current node, wherein an initial value of the current node is the initial landmark of the unmanned device;
   determining whether the current node is a landmark corresponding to a last product to be picked;
   if YES, stopping performing a step of obtaining the landmark corresponding to the product to be picked with the route closest to the current node, and taking the obtained landmark corresponding to the product to be picked as the current node again; if NO, performing the step of obtaining the landmark corresponding to the product to be picked with the route closest to the current node, and taking the obtained landmark corresponding to the product to be picked as the current node repeatedly; and
   taking a route composed of the initial landmark of the unmanned device and landmarks corresponding to products to be picked that are selected sequentially as a travel path of the unmanned device, wherein the calculating the route distance from the initial landmark of the unmanned device to the landmark corresponding to the any one product to be picked comprises:
   calculating a coordinate distance between the initial landmark of the unmanned device and the landmark corresponding to the any one product to be picked in the two-dimensional matrix map;
   determining whether the initial landmark of the unmanned device and the landmark corresponding to the any one product to be picked are located between a same two adjacent main lanes if the initial landmark of the unmanned device and the landmark corresponding to the any one product to be picked are located in different shelf lanes;

determining a number of first landmarks from the initial landmark of the unmanned device to a first main lane in the two adjacent main lanes, a number of second landmarks from the initial landmark of the unmanned device to a second main lane in the two adjacent main lanes, a number of third landmarks from the landmark corresponding to the any one product to be picked to the first main lane, and a number of fourth landmarks from the landmark corresponding to the any one product to be picked to the second main lane;

calculating a sum of the number of first landmarks and the number of third landmarks, and a sum of the number of second landmarks and the number of fourth landmarks if the initial landmark of the unmanned device and the landmark corresponding to the any one product to be picked are located between the same two adjacent main lanes; and adding a value corresponding to a smaller sum of the numbers of landmarks in the two sums of the numbers of landmarks in the two-dimensional matrix map to the coordinate distance to obtain the route distance from the initial landmark of the unmanned device to the landmark corresponding to the any one product to be picked.

2. The path planning method for the unmanned device according to claim 1, wherein:

the coordinate distance is taken as the route distance from the initial landmark of the unmanned device to the landmark corresponding to the any one product to be picked if the initial landmark of the unmanned device and the landmark corresponding to the any one product to be picked are not located between the same two adjacent main lanes.

3. The path planning method for the unmanned device according to claim 1, wherein the calculating the route distance between the landmarks corresponding to the any two products to be picked according to the coordinate values comprises:

calculating a coordinate distance between the landmarks corresponding to the any two products to be picked in the two-dimensional matrix map;

determining whether the landmarks corresponding to the any two products to be picked are located between the same two adjacent main lanes if the landmarks corresponding to the any two products to be picked are located in different shelf lanes;

determining a number of first landmarks from the landmark corresponding to a first product to be picked in the any two products to be picked to the first main lane in the two adjacent main lanes, a number of second landmarks from the landmark corresponding to the first product to be picked to the second main lane in the two adjacent main lanes, a number of third landmarks from the landmark corresponding to a second product to be picked in the any two products to be picked to the first main lane, and a number of fourth landmarks from the landmark corresponding to the second product to be picked to the second main lane;

calculating a second sum of the number of first landmarks and the number of third landmarks, and a second sum of the number of second landmarks and the number of fourth landmarks if the landmarks corresponding to the any two products to be picked are located between the same two adjacent main lanes and located in different shelf lanes; and adding a value corresponding to a smaller second sum of the numbers of landmarks in the two second sums of the numbers of landmarks in the two-dimensional matrix map to the coordinate distance to obtain the route distance between the landmarks corresponding to the any two products to be picked.

4. The path planning method for the unmanned device according to claim 3, wherein:

the coordinate distance is taken as the route distance between the landmarks corresponding to the any two products to be picked if the landmarks corresponding to the any two products to be picked are not located between the same two adjacent main lanes.

5. The path planning method for the unmanned device according to claim 1, further comprising:

selecting an optimal path among a plurality of travel paths according to an initial starting point of a next planned path if the plurality of travel paths of the unmanned device are selected.

6. The path planning method for the unmanned device according to claim 5, wherein the selecting the optimal path among the plurality of travel paths according to the initial starting point of the next planned path comprises:

selecting a travel path among the plurality of travel paths, where the landmark corresponding to the last product to be picked is closest to the initial starting point of the next planned path, as the optimal path.

7. The path planning method for the unmanned device according to claim 6, further comprising:

selecting a travel path among the plurality of travel paths, where the landmark corresponding to the last product to be picked is closest to the initial landmark, as the optimal path, if a next step is routed for the unmanned device to return to the initial landmark.

8. A path planning device for an unmanned device, comprising:

a memory; and a processor coupled to the memory, wherein the processor is configured to execute a path planning method for the unmanned device, comprising:

determining a location of each landmark within a warehouse;

mapping each landmark within the warehouse to a two-dimensional matrix map;

determining a coordinate of an initial landmark of the unmanned device in the two-dimensional matrix map, and coordinates of a landmark corresponding to any one product to be picked in the two-dimensional matrix map;

calculating a route distance from the initial landmark of the unmanned device to the landmark corresponding to the any one product to be picked and a route distance between landmarks corresponding to any two products to be picked according to coordinate values;

taking a current landmark as a current node, obtaining a landmark corresponding to a product to be picked with a route closest to the current node, and taking the obtained landmark corresponding to the product to be picked as the current node, wherein an initial value of the current node is the initial landmark of the unmanned device;

determining whether the current node is a landmark corresponding to a last product to be picked;

if YES, stopping performing a step of obtaining the landmark corresponding to the product to be picked with the route closest to the current node, and taking the obtained landmark corresponding to the product to be picked as the current node again; if NO, performing the step of obtaining the landmark corresponding to the product to be picked with the route closest to the current node, and taking the obtained landmark corresponding to the product to be picked as the current node repeatedly; and taking a route composed of the initial landmark of the unmanned device and landmarks corresponding to products to be picked that are selected sequentially as a travel path of the unmanned device, wherein the calculating the route distance from the initial landmark of the unmanned device to the landmark corresponding to the any one product to be picked comprises:

calculating a coordinate distance between the initial landmark of the unmanned device and the landmark corresponding to the any one product to be picked in the two-dimensional matrix map;

determining whether the initial landmark of the unmanned device and the landmark corresponding to the any one product to be picked are located between a same two adjacent main lanes if the initial landmark of the unmanned device and the landmark corresponding to the any one product to be picked are located in different shelf lanes;

determining a number of first landmarks from the initial landmark of the unmanned device to a first main lane in the two adjacent main lanes, a number of second landmarks from the initial landmark of the unmanned device to a second main lane in the two adjacent main lanes, a number of third landmarks from the landmark corresponding to the any one product to be picked to the first main lane, and a number of fourth landmarks from the landmark corresponding to the any one product to be picked to the second main lane;

calculating a sum of the number of first landmarks and the number of third landmarks, and a sum of the number of second landmarks and the number of fourth landmarks if the initial landmark of the unmanned device and the landmark corresponding to the any one product to be picked are located between the same two adjacent main lanes; and adding a value corresponding to a smaller sum of the numbers of landmarks in the two sums of the numbers of landmarks in the two-dimensional matrix map to the coordinate distance to obtain the route distance from the initial landmark of the unmanned device to the landmark corresponding to the any one product to be picked.

9. The path planning device for the unmanned device according to claim 8, wherein the calculating the route distance from the initial landmark of the unmanned device to the landmark corresponding to the any one product to be picked further comprises:

taking the coordinate distance as the route distance from the initial landmark of the unmanned device to the landmark corresponding to the any one product to be picked if the initial landmark of the unmanned device and the landmark corresponding to the any one product to be picked are not located between the same two adjacent main lanes.

10. The path planning device for the unmanned device according to claim 8, wherein the calculating the route distance between the landmarks corresponding to the any two products to be picked according to the coordinate values comprises:

calculating a coordinate distance between the landmarks corresponding to the any two products to be picked in the two-dimensional matrix map;

determining whether the landmarks corresponding to the any two products to be picked are located between the same two adjacent main lanes if the landmarks corresponding to the any two products to be picked are located in different shelf lanes;

determining a number of first landmarks from the landmark corresponding to a first product to be picked in the any two products to be picked to the first main lane in the two adjacent main lanes, a number of second landmarks from the landmark corresponding to the first product to be picked to the second main lane in the two adjacent main lanes, a number of third landmarks from the landmark corresponding to a second product to be picked in the any two products to be picked to the first main lane, and a number of fourth landmarks from the landmark corresponding to the second product to be picked to the second main lane;

calculating a second sum of the number of first landmarks and the number of third landmarks, and a second sum of the number of second landmarks and the number of fourth landmarks if the landmarks corresponding to the any two products to be picked are located between the same two adjacent main lanes and located in different shelf lanes; and adding a value corresponding to a smaller second sum of the numbers of landmarks in the two second sums of the numbers of landmarks in the two-dimensional matrix map to the coordinate distance to obtain the route distance between the landmarks corresponding to the any two products to be picked.

11. The path planning device for the unmanned device according to claim 10, wherein the calculating the route distance between the landmarks corresponding to the any two products to be picked according to the coordinate values further comprises:

taking the coordinate distance as the route distance between the landmarks corresponding to the any two products to be picked if the landmarks corresponding to the any two products to be picked are not located between the same two adjacent main lanes.

12. The path planning device for the unmanned device according to claim 8, wherein the path planning method for the unmanned device further comprises:

selecting an optimal path among a plurality of travel paths according to an initial starting point of a next planned path if the plurality of travel paths of the unmanned device are selected.

13. The path planning method for the unmanned device according to claim 12, wherein the selecting the optimal path among the plurality of travel paths according to the initial starting point of the next planned path comprises:

selecting a travel path among the plurality of travel paths, where the landmark corresponding to the last product to be picked is closest to the initial starting point of the next planned path, as the optimal path.

14. The path planning device for the unmanned device according to claim 13, wherein the path planning method for the unmanned device further comprises:

selecting a travel path among the plurality of travel paths, where the landmark corresponding to the last product to be picked is closest to the initial landmark, as the optimal path, if a next step is routed for the unmanned device to return to the initial landmark.

15. A non-transitory computer readable storage medium, wherein the non-transitory computer readable storage medium stores computer program instructions which, when executed by a processor, implement a path planning method for an unmanned device, comprising:

determining a location of each landmark within a warehouse;

mapping each landmark within the warehouse to a two-dimensional matrix map;

determining a coordinate of an initial landmark of the unmanned device in the two-dimensional matrix map, and coordinates of a landmark corresponding to any one product to be picked in the two-dimensional matrix map;

calculating a route distance from the initial landmark of the unmanned device to the landmark corresponding to the any one product to be picked and a route distance between landmarks corresponding to any two products to be picked according to coordinate values;

taking a current landmark as a current node, obtaining a landmark corresponding to a product to be picked with a route closest to the current node, and taking the obtained landmark corresponding to the product to be picked as the current node, wherein an initial value of the current node is the initial landmark of the unmanned device;

determining whether the current node is a landmark corresponding to s last product to be picked;

if YES, stopping performing a step of obtaining the landmark corresponding to the product to be picked with the route closest to the current node, and taking the obtained landmark corresponding to the product to be picked as the current node again; if NO, performing the step of obtaining the landmark corresponding to the product to be picked with the route closest to the current node, and taking the obtained landmark corresponding to the product to be picked as the current node repeatedly; and taking a route composed of the initial landmark of the unmanned device and landmarks corresponding to products to be picked that are selected sequentially as a travel path of the unmanned device, wherein the calculating the route distance from the initial landmark of the unmanned device to the landmark corresponding to the any one product to be picked comprises:

calculating a coordinate distance between the initial landmark of the unmanned device and the landmark corresponding to the any one product to be picked in the two-dimensional matrix map;

determining whether the initial landmark of the unmanned device and the landmark corresponding to the any one product to be picked are located between a same two adjacent main lanes if the initial landmark of the unmanned device and the landmark corresponding to the any one product to be picked are located in different shelf lanes;

determining a number of first landmarks from the initial landmark of the unmanned device to a first main lane in the two adjacent main lanes, a number of second landmarks from the initial landmark of the unmanned device to a second main lane in the two adjacent main lanes, a number of third landmarks from the landmark corresponding to the any one product to be picked to the first main lane, and a number of fourth landmarks from the landmark corresponding to the any one product to be picked to the second main lane;

calculating a sum of the number of first landmarks and the number of third landmarks, and a sum of the number of second landmarks and the number of fourth landmarks if the initial landmark of the unmanned device and the landmark corresponding to the any one product to be picked are located between the same two adjacent main lanes; and adding a value corresponding to a smaller sum of the numbers of landmarks in the two sums of the numbers of landmarks in the two-dimensional matrix map to the coordinate distance to obtain the route distance from the initial landmark of the unmanned device to the landmark corresponding to the any one product to be picked.

* * * * *